United States Patent [19]

Ibe et al.

[11] Patent Number: 4,788,277

[45] Date of Patent: Nov. 29, 1988

[54] METHOD FOR PRODUCING A POLYPHENYLENE ETHER

[75] Inventors: Sadao Ibe, Tokyo; Tokio Sakurai, Yokohama; Kazuhiro Takahashi, Kimitsu; Yoshiro Unno, Kimitsu, all of Japan

[73] Assignee: Asahi Kasei Kogyo Kabushiki Kaisha, Osaka, Japan

[21] Appl. No.: 127,842

[22] Filed: Dec. 2, 1987

[30] Foreign Application Priority Data

Dec. 4, 1986 [JP] Japan .................................. 61-287788
Feb. 13, 1987 [JP] Japan .................................. 62-29591
Apr. 1, 1987 [JP] Japan .................................. 62-77570

[51] Int. Cl.$^4$ .................................................. C08G 65/44
[52] U.S. Cl. ............................ 528/215; 525/132; 528/212; 528/214; 528/217
[58] Field of Search ............ 528/215, 212, 214, 217

[56] References Cited

U.S. PATENT DOCUMENTS

| | | | |
|---|---|---|---|
| 3,306,875 | 2/1967 | Hay | 260/47 |
| 3,344,116 | 9/1967 | Borman | 260/47 |
| 3,432,466 | 3/1969 | Hay | 260/47 |
| 3,989,671 | 11/1976 | Yonemitso et al. | 260/47 |
| 4,092,294 | 5/1978 | Bennett et al. | 260/47 |
| 4,471,068 | 9/1984 | Haitko | 502/165 |
| 4,477,651 | 10/1984 | White et al. | 528/215 |
| 4,537,948 | 8/1985 | Bartmann et al. | 528/215 |
| 4,734,485 | 3/1988 | Bartmann et al. | 528/215 |

FOREIGN PATENT DOCUMENTS 930993 7/1963 United Kingdom .
1497293 1/1978 United Kingdom .
103154 3/1984 European Pat. Off. .
111722 6/1984 European Pat. Off. .

OTHER PUBLICATIONS

Journal of Polymer Science, vol. 8, part A-1, No. 6, pp. 1427–1438, Jun. 1970.
Journal of Polymer Science, vol. 9, part A-1, No. 3, pp. 663–675, Mar. 1971.
Journal of Polymer Science, vol. 10, Part A-1, No. 6, pp. 1565–1578, Jun. 1972.

*Primary Examiner*—Harold D. Anderson
*Attorney, Agent, or Firm*—Armstrong, Nikaido, Marmelstein & Kubovcik

[57] ABSTRACT

There is disclosed a novel method for producing a polyphenylene ether, in which a phenol compound is reacted with an oxidizing agent in a reaction medium in the presence of a highly active catalyst comprising at least one copper compound, at least one 1,3-diamine compound selected from N,N,N',N'-tetramethyl-1,3-diaminopropanes and at least one halogen compound selected from a bromine compound and a chlorine compound, wherein the reaction medium contains at least one alcohol selected from the group consisting of methanol and ethanol. The novel method can be advantageously employed for efficiently producing a polyphenylene ether which has a desirable color and gives a composition improved with respect to Izod impact strength in combination with a rubber-reinforced polystyrene and the like. Major application of such a composition is found in the field of generally known engineering plastics.

10 Claims, No Drawings

METHOD FOR PRODUCING A POLYPHENYLENE ETHER

BACKGROUND OF THE INVENTION

1. Field Of The Invention

The present invention relates to a method for producing a polyphenylene ether. More particularly, the present invention is concerned with a novel method in which oxidative coupling of a phenol compound is effected in a reaction medium containing methanol and or ethanol in the presence of a highly active catalyst having an improved water resistance which is comprised of at least one copper compound, at least one 1,3-diamine compound and at least one halogen compound. The novel method can be advantageously employed for producing a polyphenylene ether which has a desirable color and gives a composition improved with respect to Izod impact strength in combination with a rubber-reinforced polystyrene and the like. Major application of such a composition is found in the field of generally known engineering plastics.

2. Discussion Of Related Art

It was proposed in U.K. Pat. No. 930,993 to use a copper compound in combination with a member selected from various amines as a polymerization catalyst in the method for the production of a polyphenylene ether in which oxidative coupling of a phenol compound was conducted. Since then, a number of proposals have been made to provide an improved process by the use of a specific species of copper compound, by the use of combination of a copper compound with a halogen compound, or by the use of a specific amine, e.g. a primary, secondary or tertiary amine, a monoamine or a di- or polyamine.

For example, U.S. Pat. Nos. 3,306,875, 3,344,116 and 3,432,466 disclose a catalyst for producing a polyphenylene ether which comprises a copper compound and a tetraalkyldiamine, e.g. N,N,N',N'-tetramethyl-1,3-butanediamine. Further, U.S. Pat. No. 3,989,671 discloses a catalyst for producing a polyphenylene ether which comprises a copper compound, a tetraalkyldiamine and an iodine compound. The catalysts disclosed in these publications, however, do not have a desirably high catalytic activity.

Recently, U.K. Pat. No. 1,497,293 discloses that a copper amine complex, e.g. a complex comprised of a copper ion, a bromide ion, N,N'-di-t-butyl-ethylenediamine and a tertiary amine, e.g. N-methylpyrrolidine, has a somewhat improved catalytic activity in a process for producing a polyphenylene ether. It has become apparent, however, that the polyphenylene ether as produced using the above-mentioned catalyst has an undesirable color and, when it is combined with a styrene resin, e.g. rubber-modified polystyrene, it gives a composition having a poor impact resistance and a poor thermal stability. To cope with this problem, the use of such a complex catalyst in combination with a secondary monoamine, e.g. di-n-butylamine, has been proposed as disclosed in U.S. Pat. No. 4,092,294. Further, the use of such a complex catalyst in combination with a bromide ion is disclosed in European Pat. No. 103,154 in which the ratio of the bromide ion to a phenol compound to be coupled is at least 1:35. Moreover, in order to overcome the problem, the use of such a complex catalyst characterized by the employment of a mixture of a cuprous salt and a cupric salt as a copper source has been proposed as disclosed in European Pat. No. 111,722, and that characterized by the employment of a dimethylamine as a secondary monoamine has been proposed as disclosed in U.S. Pat. No. 4,477,651.

The catalytic activities of the conventional catalysts are not satisfactory, especially in a continuous process for the polymerization of a polyphenylene ether. This is partly attributable to the consumption of an amine component, e.g. N,N'-di-t-butylethylenediamine, during the polymerization step of a phenol compound. In this connection, reference may be made to U.S. Pat. No. 4,471,068. Further, it is to be noted that all of the known catalysts as set forth above have a serious drawback in that their catalytic activity is disadvantageously decreased by the action of the water formed during the oxidative coupling of a phenol compound. It is believed that the water causes a component or components of the catalyst to be hydrolyzed and also causes a metal component of the catalyst to be changed to an inactive state in the oxidative coupling of a phenol compound, leading to a lowering in the catalytic activity of the known catalysts.

SUMMARY OF THE INVENTION

With a view toward obviating the above-mentioned disadvantageous decrease of the catalytic activity due to the water formed during the oxidative coupling of a phenol compound, the present inventors have conducted extensive and intensive studies. As a result, the present inventors have unexpectedly found that in a reaction medium containing methanol and/or ethanol, a catalyst comprising a copper compound, a specific diamine, and a bromine compound and/or a chlorine compound not only exhibits a high catalytic activity in the oxidative coupling of a phenol compound, but also has an excellent resistance to the water formed during the oxidative coupling. The present invention is based on this unexpected finding.

Accordingly, it is an object of the present invention to provide a novel method for effectively and efficiently producing a polyphenylene ether by the use of a catalyst exhibiting an excellent catalytic activity in the oxidative coupling of a phenol compound and having an excellent resistance to the water formed during the oxidative coupling.

It is another object of the present invention to provide a novel polyphenylene ether product having a desirable color and being capable of giving a composition improved with respect to impact resistance in combination with a rubber-modified polystyrene and the like.

The foregoing and other objects, features and advantages of the present invention will be apparent from the following detailed description and appended claims.

DETAILED DESCRIPTION OF THE INVENTION

In one aspect of the present invention, there is provided a method for producing a polyphenylene ether, which comprises contacting a phenol compound represented by the formula:

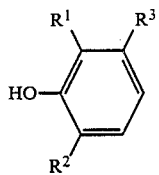

(I)

wherein R¹ represents a hydrocarbon residue having 1 to 4 carbon atoms or a substituted or unsubstituted phenyl group, R² represents a member selected from the group consisting of a halogen atom, a hydrocarbon residue having 1 to 4 carbon atoms and a substituted or unsubstituted phenyl group, and R³ represents a member selected from the group consisting of a hydrogen atom, a halogen atom, a hydrocarbon residue having 1 to 4 carbon atoms and a substituted or unsubstituted phenyl group, with an oxidizing agent in a reaction medium containing at least one alcohol selected from the group consisting of methanol and ethanol in the presence of a catalyst comprising at least one copper compound, at least one 1,3-diamine compound selected from the group consisting of N,N,N',N'-tetramethyl-1,3-diaminopropane and an N,N,N',N'-tetramethyl-1,3-diaminopropane having one substituent on its propane chain, and at least one halogen compound selected from the group consisting of a bromine compound and a chlorine compound.

Examples of phenol compounds of the above-indicated formula (I) to be employed as a starting material include 2,6-dimethylphenol, 2,3,6,trimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2,6-diphenylphenol, 2-methyl-6-tolylphenol, 2,6-ditolylphenol and the like. These compounds may be employed alone or in combination. Of the above-mentioned phenol compounds, 2,6-dimethylphenol is most preferred, because it is readily available and it gives a polyphenylene ether having excellent properties. In practicing the method of the present invention, the starting material may contain a small amount, for example about 1% by weight or less, of o-cresol, m-cresol, p-cresol, 2,4-dimethylphenol, 2-ethylphenol and the like.

The proportion of the phenol compound to the reaction medium may be widely varied. Generally, the phenol compound may be employed in a concentration of not greater than 70% by weight, preferably from 10 to 40% by weight, more preferably from 20 to 35% by weight, based on the total amount of the phenol compound and the reaction medium.

Examples of oxidizing agents to be employed in the present invention include pure oxygen gas, a mixed gas comprised of oxygen gas and an inert gas, e.g. nitrogen gas, in various proportions, and air. Generally, it is preferred that oxygen gas or air be employed. The oxidizing agent may be introduced into a mixture of a phenol compound, a reaction medium and a catalyst under atmospheric pressure or a super atmospheric pressure.

In practicing the method of the present invention, it is preferred that a cuprous salt, a cupric salt or a mixture thereof be employed as the copper compound component of the catalyst. The types of the cuprous salt and the cupric salt are not critical. However, from the viewpoints of the economy and availability, soluble cuprous and cupric salts are preferred.

Example of cuprous salts to be employed in the present invention include cuprous chloride, cuprous bromide, cuprous sulfate, cuprous nitrate, cuprous azide, cuprous acetate, cuprous butyrate, cuprous toluate and the like. Of these, cuprous chloride and cuprous bromide are preferred. On the other hand, examples of cupric salts to be employed in the present invention include a cupric halide such as cupric chloride and cupric bromide, cupric sulfate, cupric nitrate, cupric azide, cupric toluate and the like. Of these, cuprous and cupric chlorides and cuprous and cupric bromides are preferred. These cuprous and cupric salts may be prepared by the reaction between a material such as a cuprous or cupric oxide, a cuprous or cupric carbonate and a cuprous or cupric hydroxide and a halogen or a hydrogen halide.

The amount of the copper compound is not critical. It is, however, generally preferred that the copper compound be employed in an amount such that from 0.005 to 0.5 gram atom, more preferably from 0.01 to 0.1 gram atom, of copper is present per 100 moles of a phenol compound. It is to be noted that the proportion of the copper compound to the phenol compound can be extremely low as compared to those in the case where the conventional catalyst is employed, and that accordingly the catalytic activity per gram atom of copper of the copper compound is extremely high in the present invention as compared to those of the conventional catalysts.

In the present invention, at least one 1,3-diamine compound selected from the group consisting of N,N,N',N'-tetramethyl-1,3-diaminopropane and an N,N,N',N'-tetramethyl-1,3-diaminopropane having a substituent on its propane chain is employed as an essential component of the catalyst. Preferred examples of N,N,N',N'-tetramethyl-1,3-diaminopropanes having a substituent on its propane chain include an N,N,N',N'-tetramethyl-1,3-diamino-lower alkyl-monosubstituted propane such as N,N,N',N'-tetramethyl-1,3-diamino-1-methylpropane, N,N,N',N'-tetramethyl-1,3-diamino-2-methylpropane, N,N,N',N'-tetramethyl-1,3-diamino-1-ethylpropane, N,N,N',N'-tetramethyl-1,3-diamino-2-ethylpropane, and the like. Of these 1,3-diamine compounds, N,N,N',N'-tetramethyl-1,3-diaminopropane, N,N,N',N'-tetramethyl-1,3-diamino-1-methylpropane and N,N,N',N'-tetramethyl-1,3-diamino-2-methylpropane are preferred. As compared to the N,N'-di-t-butylethylenediamines known as having a somewhat improved catalytic activity which are only effective in combination with another secondary or tertiary amine, the 1,3-diamine compounds to be employed in the present invention are capable of functioning both as a tertiary amine and as a chelating agent so that these advantageously exhibit a high catalytic activity even in the absence of another secondary or tertiary amine. The reason why a high catalytic activity is attained by the employment of N,N,N',N'-tetramethyl-1,3-diaminopropane or an N,N,N',N'-tetramethyl-1,3-diaminopropane having a substituent on its propane chain as compared to N,N,N',N'-tetramethylethylenediamine and N,N'-di-t-butylethylenediamine (see the Comparative Examples which follow) has not yet been elucidated, but it is believed to be due to a specific steric configuration.

The amount of the 1,3-diamine compound to be employed in the present invention is not critical. Generally, however, the 1,3-diamine compound is employed in an amount of from about 0.1 to 10 moles, preferably from about 1 to 6 moles, per 100 moles of the phenol compound.

In the present invention, it is requisite that the 1,3-diamine compound be employed in combination with a bromine compound and/or a chlorine compound. A high catalytic activity cannot be attained by the employment of the 1,3-diamine compound in combination with an iodine compound. When the amount of the copper compound is small, any oxidative coupling of a phenol compound does not occur by the employment of the 1,3-diamine compound in combination with an iodine compound.

The type of a halogen compound to be employed in the present invention is not critical, and any known bromine and chlorine compounds may be employed in the present invention. Examples of halogen compounds to be employed in the present invention include hyrogen bromide, hydrogen chloride, sodium bromide, sodium chloride, potassium bromide, potassium chloride, cuprous bromide, cupric bromide, cuprous chloride, cupric chloride and the like. It is to be noted that cuprous and cupric bromides and cuprous and cupric chlorides are capable of functioning as both the copper compound and halogen compound to be employed in the present invention. Of these halogen compounds, hydrogen bromide and hydrogen chloride are most preferred. The amount of the halogen compound to be employed in the present invention is not critical. Generally, however, the halogen compound may be employed in an amount of from about 0.5 to 20 moles, preferably from about 1 to 10 moles, per gram atom of the copper contained in the copper compound.

The catalyst to employed in the present invention may further comprise at least one member selected from the group consisting of an N-(substituted or unsubstituted)-phenylethanolamine, an N-alkylalkanolamine, an aniline having a substituent of a hydrocarbon residue at its N-position and a secondary aliphatic amine, so that the catalytic activity for the oxidative coupling of a phenol compound and the color of the ultimate polyphenylene ether may be further improved. The amount of these additional components of the catalyst is not critical. Generally, however, these may be employed in an amount of from about 0.05 to 15 moles, preferably from about 0.1 to 5 moles, per 100 moles of the phenol compound.

With respect to the above-mentioned N-(substituted)-phenylethanolamine, suitable substituents at the phenyl moiety thereof are, for example, a lower alkyl group and a lower alkoxy group both of which may be substituted with a halogen atom. Examples of the N-(substituted) phenylethanolamine to be employed in the present invention include N-phenylethanolamine, N-(m-methyl)phenylethanolamine, N-(m-methyl)phenylethanolamine, N-(2',6'-dimethyl)phenylethanolamine, N-(p-methoxy)phenylethanolamine, N-(p-chloro)phenylethanolamine, N-(m-chloro)phenylethanolamine, N-(o-chloro)phenylehanolamine, N-(o-ethyl)phenylethanolamine, N-(m-ethyl)phenylethanolamine, N-(p-ethyl)phenylethanolamine and the like. Of these ethanolamines, N-phenylethanolamine, N-(p-chloro)phenylethanolamine, N-(2',6'-dimethyl)phenylethanolamine and N-(o-ethyl)phenylethanolamine are preferred.

The N-alkylalkanolamine to be employed in the present invention preferably has a structure represented by the formula:

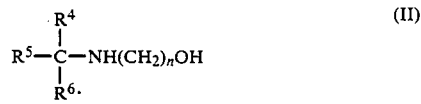

wherein $R^4$, $R^5$ and $R^6$ each independently represent a methyl group or an ethyl group and n is an integer of 2 to 4. Examples of N-alkylalkanolamines to be employed in the present invention include N-t-butylethanolamine, N-t-butylpropanolamine, N-t-butylbutanolamine, N-t-pentylethanolamine, N-t-pentylpropanolamine, N-t-pentylbutanolamine, N-(1'-methyl-1'-ethyl)propylethanolamine, N-(1'-methyl-1'-ethyl)propylpropanolamine, and N-(1'-methyl-1'-ethyl)propylbutanolamine. Of these alkanolamines, N-t-butylethanolamine is most preferred.

The type of an aniline having a substituent of a hydrocarbon residue at its N-position to be employed in the present invention is not critical. Generally, however, it is preferred to employ anilines represented by the formula:

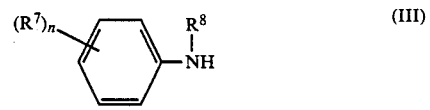

wherein $R^7$ represents a lower alkyl group, n is an integer of 0 to 5, and $R^8$ represents an alkyl group, a cycloalkyl group or an aryl group including that having a heterocyclic ring. Of the anilines represented by the formula (III), those in which $R^8$ is a lower alkyl group or a lower aryl group are preferred.

Examples of anilines to be employed in the present invention include N-methylaniline, N-ethylaniline, N-propylaniline, N-butylaniline, N-methyl-2-methylaniline, N-methyl-2,6-dimethylaniline, N-methyl-2,4,6-trimethylaniline, N-naphtylaniline and diphenylamine.

Generally, in the case of the conventional catalysts, incorporation of an aniline compound thereinto causes the activity of the catalyst for promoting the oxidative coupling of a phenol compound to decrease. Hence, to cope with the decrease in the catalytic activity, the amount of a metal component of the catalyst is increased. This adversely affects the color of the ultimate polyphenylene ether. In this connection, reference may be made to U.S. Pat. No. 4,335,233. By contrast, in the present invention, incorporation of the aniline of the formula (III) is effective for further improving the catalytic activity in the oxidative coupling of a phenol compound and the color of the ultimate polyphenylene ether. From a viewpoint of the desired improvement in catalytic activity and ultimate product color, it is preferred that $R^8$ of the formula (III) be a lower alkyl group or a lower aryl group.

The secondary aliphatic amine to be employed in the present invention may be a secondary aliphatic monoamine or diamine. The secondary aliphatic monoamine preferably has a structure represented by the formula:

wherein $R^9$ and $R^{10}$ each independently represent a non-cyclic or cyclic organic group.

With respect to the formula (IV), it is preferred that $R^9$ and $R^{10}$ each independently have 1 to 20 carbon atoms, more preferably 1 to 10 carbon atoms. Further, from the viewpoint of the availability of the amine, it is preferred that $R^9$ and $R^{10}$ each independently represent an alkyl or aralkyl group having 1 to 8 carbon atoms, more preferably 2 to 6 carbon atoms, most preferably 3 to 5 carbon atoms.

Examples of secondary aliphatic monoamines to be employed in the present invention include dimethylamine, diethylamine, di-n-propylamine, di-sec-propylamine, di-n-butylamine, di-sec-butylamine, di-t-butylamine, dipentylamines, dihexylamines, diheptylamines, dioctylamines, dinonylamines, didecylamines, dieicosylamines, dibenzylamines, methylethylamine, methylbutylamines, methylcyclohexylamine, heptylcyclohexylamines, and octadecylcyclohexylamines.

The secondary aliphatic diamine to be employed in the present invention preferably has a structure represented by the formula:

wherein $R^{11}$ represents an alkyl or aralkyl group having 1 to 20 carbon atoms, $R^{12}$ represents an alkyl group having 3 to 20 carbon atoms, and $R^{13}$ and $R^{14}$ each independently represent a hydrogen atom or an alkyl or aralkyl group having 1 to 20 carbon atoms.

Examples of secondary aliphatic diamines to be employed in the present invention include N-alkyl-, N,N'-dialkyl or N,N,N'-trialkyl-diaminopropanes such as N-methyl-1,3-diaminopropane, N,N'-dimethyl-1,3-diaminopropane, N,N,N'-trimethyl-1,3-diaminopropane, N-ethyl-1,3-diaminopropane, N,N'-diethyl-1,3-diaminopropane, N,N,N'-triethyl-1,3-diaminopropane, N,N'-dimethyl-1,3-diamino-1-methylpropane, N,N'-dimethyl-1,3-diamino-2-methylpropane, N,N,N'-trimethyl-1,3-diamino-1-methylpropane, N,N,N'-trimethyl-1,3-diamino-2-methylpropane and the like; N-alkyl-, N,N'-dialkyl-, or N,N,N'-trialkyl-diaminobutanes; N-alkyl-, N,N'-dialkyl- or N,N,N'-trialkyl-diaminopentanes; N-alkyl-, N,N'-dialkyl- or N,N,N'-trialkyl-diaminohexanes; N-alkyl-, N,N'-dialkyl- or N,N,N'-trialkyl-diaminooctanes and the like.

The above-mentioned N-(substituted or unsubstituted)-phenylethanolamine, N-alkylalkanolamine, aniline having a substituent of a hydrocarbon residue at its N-position, and secondary aliphatic amine may be employed alone or in combination. Especially, a combination of the secondary aliphatic amine with the aniline having a substituent of a hydrocarbon residue at its N-position and a combination of the secondary aliphatic amine with the N-(substituted or unsubstituted)-phenylethanolamine are preferred because such combinations enable the resultant polyphenylene ether to have an improved quality, e.g. good color, and give a composition having an improved Izod impact resistance in combination with a rubber-reinforced polystyrene or the like.

Moreover, a customary tertiary amine may be added to the catalyst to be employed in the present invention within a certain range in which the activity of the catalyst is not adversely affected. Examples of such tertiary amines include an aliphatic tertiary amine including an alicyclic tertiary amine such as trimethylamine, triethylamine, tripropylamine, tributylamine, triisopropylamine, diethylmethylamine, dimethylpropylamine, allyldiethylamine, dimethyl-n-butylamine, and diethylisopropylamine; and an aliphatic tertiary polyamine, e.g. N,N,N',N'-tetraalkylethylenediamine.

The method for incorporating into the reaction medium the catalyst comprising at least one copper compound, at least one 1,3-diamine compound and at least one halogen compound is not critical, provided that the copper compound is dissolved in the reaction medium. It is generally preferred, however, that the catalyst be incorporated into the reaction medium in the form of a solution in a solvent selected from methanol, ethanol and a mixture of methanol and ethanol or in a mixed solvent comprised of such a solvent and an aromatic hydrocarbon such as benzene, toluene, xylene, and ethylbenzene. In these solvents, a phenol compound may be present. Such a catalyst solution may be prepared in an air or inert atmosphere.

In the present invention, it is requisite that the reaction medium to be employed contain at least one alcohol selected from the group consisting of methanol and ethanol. Generally, the reaction medium is comprised of the alcohol and at least one other solvent. Any solvents which are less susceptible to oxidation than a phenol compound and which are not reactive to various radicals as formed during the oxidative coupling of the phenol compound may be employed as the solvent to be used for the preparation of the reaction medium in combination with the alcohol. Generally, however, it is preferred that good solvents capable of dissolving therein the phenol compound and of dissolving therein the components of the catalyst be employed. Examples of good solvents include an aromatic hydrocarbon such as benzene, toluene, xylene and the like and a halogenated hydrocarbon such as chloroform, 1,2-dichloroethane, a trichloroethane, chlorobenzene, a dichlorobenzene and the like.

When methanol and/or ethanol is employed in combination with the above-mentioned good solvents in a suitable ratio, the oxidative coupling of a phenol compound is performed in a solution. That is, a solution polymerization is effected. The solution polymerization may be conducted batchwise or in a continuous manner in which the phenol compound and the oxidizing agent are continuously fed and the resultant polyphenylene ether is continuously taken out.

Also, a poor solvent may be employed in combination with the good solvent to prepare the reaction medium to be employed in the present invention. When the proportion of the poor solvent to the good solvent is increased, the resultant polymer becomes insoluble in the reaction medium, so that the polymer precipitates. That is, a precipitation polymerization occurs. The precipitation polymerization may be conducted batchwise or in a continuous manner as mentioned above. From the viewpoint of efficient production of a polyphenylene ether, the continuous precipitation polymerization is most preferred.

Examples of poor solvents which can be suitably employed in the present invention are an alcohol such as propanol, butanol, benzyl alcohol, cyclohexanol and the like, a ketone such as acetone, methyl ethyl ketone and the like, an ester such as ethyl acetate, ethyl formate and the like, an ether such as tetrahydrofuran, diethyl ether and the like, an amide such as dimethylformamide, and an aliphatic hydrocarbon such as pentane, hexane, heptane, cyclohexane, cycloheptane and the like.

As mentioned above, the reaction medium to be employed in the present invention contains at least one alcohol selected from the group consisting of methanol and ethanol. Of these, the use of methanol is more preferred.

The proportion of methanol and/or ethanol to the reaction medium may be widely varied. Generally, however, it is preferred that the methanol and/or ethanol concentration of the reaction medium be in the range of from about 1 to 80% by weight, more preferably from about 5 to 75% by weight, most preferably from 10 to 50% by weight. Accordingly, it is generally preferred that the total concentration of the good solvent and poor solvent in the reaction medium be in the range of from about 99 to 20% by weight, more preferably from about 95 to 25% by weight. The proportion of the poor solvent to the good solvent is not critical, but generally in the range of from about 0 to 60% by weight, more preferably from about 0 to 50% by weight.

The incorporation of at least one member selected from the group consisting of methanol and ethanol into the reaction medium is requisite in the present invention since otherwise the catalyst cannot exhibit a high catalytic activity. A high catalytic activity cannot be attained by the use of the conventional reaction media such as an aromatic solvent, propanol, and a mixture of an aromatic solvent and propanol. The reason why a high catalytic activity is attained by the incorporation of methanol and/or ethanol into the reaction medium has not yet been elucidated. However, it is believed to be due to the favorable effect of methanol and/or ethanol on the prevention of the phase separation of the water formed during the oxidative coupling of a phenol compound and to the coordination of methanol and/or ethanol to the active sites of the catalyst.

A quaternary ammonium salt and/or a surface active agent, which are/is customarily employed, may be added to a reaction system comprising a phenol compound, an oxidizing agent, a reaction medium and a catalyst, so that the reaction rate of the oxidative coupling can be improved, the particle size of the polymer can be controlled in the case of a precipitation polymerization, and the phase separation between solvents can be prevented.

In the reaction between a phenol compound and an oxidizing agent, if the reaction temperature is too low, the reaction rate is retarded. On the other hand, if the reaction is too high, the catalyst is inactivated. Accordingly, it is preferred that the reaction temperature be in the range of from about 0° to 80° C., more preferably from about 10° to 60° C.

In the present invention, generally, the reaction time is in the range of from about ten minutes to about a hundred hours.

After completion of the oxidative coupling of the phenol compound, the polyphenylene ether produced may be recovered according to customary procedures. For example, the polyphenylene ether may be recovered by a method in which first, the catalyst is inactivated by addition of an acid such as hydrochloric acid and acetic acid or a chelating agent such as ethylenediaminetetraacetic acid and nitrilopolyacetic acid to the reaction mixture, followed by separation of the polymer, and subsequently the polymer is washed with a solvent, e.g. methanol, which does not dissolve the polymer, and dried.

In the present invention, since the catalyst improved in water resistance is employed, the amount of the catalyst to be incorporated into the reaction system can be decreased as compared to that in the prior art. Especially, the copper compound component of the catalyst can be greatly decreased as mentioned hereinbefore. Accordingly, the amount of the solvent to be used for removal by washing of any catalyst remaining in the polymer, especially the copper compound remaining in the polymer, can be decreased. These are advantageous in that the recovery cost of solvents can be decreased, and that removal of the catalyst from the polymer can be effected in simplified facilities.

The method of the present invention is useful for producing a polyphenylene ether having excellent properties. The polyphenylene ether of the present invention has advantages in that it has a good color and gives a composition excellent in Izod impact resistance in combination with a rubber-reinforced polystyrene and/or other polymers. Therefore, advantageous applications of the polyphenylene ether of the present invention are found especially in the field of engineering plastics.

DETAILED DESCRIPTION OF THE PREFERRED EMBODIMENTS

The present invention will now be described in more detail with reference to thefollowing Examples that by no means limit the scope of the invention.

In the following Examples and Comparative Examples, the viscosity and color index of polyphenylene ethers were determined according to the following methods.

(1) Measurement of the viscosity ($\eta_{sp}/c$) of a polyphenylene ether

An aliquot of a polyphenylene ether is dissolved in chloroform, thereby obtaining 0.5 w/v % solution. The viscosity ($\eta$) of the solution is measured at 30° C. using an Ubbellohde viscometer, and the $\eta_{sp}/c$ is calculated from the viscosity according to the formula:

$$\eta_{sp}/c = (\eta/\eta_s - 1)/0.5$$

wherein $\eta_s$: viscosity of chloroform.

(2) Measurement of the color indexes of polyphenylene ethers as produced and after compression molding From each of a polyphenylene ether as produced and a polyphenylene ether obtained by subjecting a polyphenylene ether as produced to compression molding at 310° C., 0.5 g is separately sampled and dissolved in chloroform, thereby obtaining a solution. The volume of each of the solutions is increased to 100 ml by addition of chloroform, thereby obtaining a sample solution. The absorbance at 480 nm and at 25° C. of each of the sample solutions is measured, and the color index of the polymer is calculated according to the formula:

$$\text{Color index} = \frac{\log\left(\frac{I_o}{I}\right)}{a \cdot b} \times 100$$

wherein
$I_o$: intensity of incident light
$I$: intensity of transmitted light
$a$: length of cell (cm)
$b$: concentration of sample solution (g/cm$^3$)

Note

The lower the color index of the polymer after compression molding, the more stable to thermal oxidation the polymer is.

EXAMPLE 1

Oxidative coupling of a phenol compound was conducted as follows, using a 100 ml glass reaction vessel equipped with an inlet and outle for oxygen, a stirrer and a thermometer.

0.00205 g (0.0144 millimole) of a finely powdered cuprous oxide and 0.0275 g (0.264 millimole) of 35% aqueous hydrochloric acid were charged in the reaction vessel, and stirred with the above-mentioned stirrer to completely dissolve the cuprous oxide in the hydrochloric acid. Then, 6.3 g of methanol was added to the thus obtained solution. Separately, a liquid mixture of 0.1495 g (1.15 millimoles) of N,N,N',N'-tetramethyl-1,3-diaminopropane and 6.3 g methanol was prepared. The liquid mixture was added to the mixture contained in the glass reaction vessel. Further, to the mixture, a solution prepared by dissolving 7.0 g (57.4 millimoles) of 2,6-dimethylphenol in 37.8 g of toluene, and 12.6 g of n-butanol were added, thereby obtaining a mixture for oxidative coupling reaction.

As seen from the foregoing, the reaction medium amounted to 63 g, and it consisted of toluene, n-butanol and methanol in weight proportions of 60:20:20. Further, the concentration of 2,6-dimethylphenol in the mixture for oxidative coupling reaction was 10% by weight. In the mixture, 0.05 gram atom of copper was present per 100 moles of 2,6-dimethylphenol.

To the mixture for oxidative coupling reaction was added 1.03 g of water corresponding to the amount of water to be produced by the oxidative coupling of the phenol compound. The water was added to evaluate the water resistance of the catalyst. While stirring, oxygen gas was passed through the mixture for oxidative coupling reaction at 30° C. for 3.5 hours. The reaction mixture turned to a yellowish white slurry. Methanol was added to the slurry in a volume equal to 5 times that of the slurry. The resulting mixture was subjected to filtration to collect a reaction product and then, the reaction product was washed and dried. The viscosity ($\eta_{sp}/c$) of the thus-obtained polymer was 0.53.

EXAMPLES 2 TO 4 AND COMPARATIVE EXAMPLES 1 TO 3

Substantially the same procedure as described in Example 1 was repeated except that the amount of the copper compound, the type and amount of the 1,3-diamine compound, and the type of the halogen compound were varied as indicated in Table 1. The results are shown in Table 1.

EXAMPLES 5 AND 7

Substantially the same procedure as described in Example 1 was repeated except that the composition of the reaction medium used for the reaction was varied as shown in Table 2. The results are shown in Table 2.

EXAMPLE 6

Substantially the same procedure as described in Example 5 was repeated except that N,N,N',N'-tetramethyl-1,3-diamino-1-methylpropane was used as indicated in Table 2. The result is shown in Table 2.

EXAMPLE 8

Substantially the same procedure as described in Example 1 was repeated except that a 75:25 mixture of toluene and ethanol was used in place of the 60:20:20 mixture of toluene, n-butanol and methanol. The result is shown in Table 2.

COMPARATIVE EXAMPLES 4 TO 6

Substantially the same procedure as described in Example 8 was repeated except that n-propanol, isopropanol and n-butanol were separately used in place of ethanol. The results are shown in Table 2.

EXAMPLE 9

Substantially the same procedure as described in Example 1 was repeated, except that the amounts of the copper compound and the 1,3-diamine compound were varied, that 0.0267 g of 48% aqueous hydrobromic acid was used in place of 0.0275 g of 35% aqueous hydrochloric acid and that N-phenylethanolamine was added, as shown in Table 1. The viscosity of the thus-obtained polymer was 0.56 as shown in Table 1.

EXAMPLES 10 TO 19

Substantially the same procedure as described in Example 9 was repeated except that the components of the catalyst were varied as shown in Table 1. The results are shown in Table 1.

EXAMPLES 20 TO 25

Substantially the same procedure as described in Example 1 was repeated except that the components of the catalyst were varied as shown in Table 1. The results are shown in Table 1.

EXAMPLE 26

Substantially the same procedure as described in Example 9 was repeated except that the amounts of the copper compound and the halogen compound were varied and that N-ethylaniline was used in place of N-phenylethanolamine, as shown in Table 1. The viscosity of the thus-obtained polymer was 0.59, as shown in Table 1.

EXAMPLES 27 TO 40

Substantially the same procedure as described in Example 26 was repeated except that the amount of the copper compound, the type and amount of the halogen compound, the type and amount of the 1,3-diamine compound and the type and amount of the aniline having a substituent of a hydrocarbon residue at its N-position were varied as shown in Table 1. The results are shown in Table 1.

EXAMPLE 41

Oxidative coupling of a phenol compound in a continuous manner was conducted using a reaction apparatus comprising a 1.5 l first reaction vessel equipped with a circulating pump, a thermometer, an oxygen gas inlet and an oxygen gas outlet, a 3.7 l second reaction vessel equipped with a stirrer, a thermometer, an oxygen gas inlet and an oxygen gas outlet, and a 1.5 l third reaction vessel equipped with a stirrer, a thermometer, an oxygen gas inlet and an oxygen gas outlet. The first vessel and the second vessel had been connected so as to cause the mixture in the first vessel to be fed into the second vessel by the head pressure. The second vessel and the third vessel had been connected so as to cause the mixture in the second vessel to be fed into the third vessel by overflow. The third vessel had been provided with a discharge aperture through which the polymer slurry was continuously taken out.

A catalyst solution was prepared in the air by adding methanol and further N-ethylaniline, N,N,N',N'-tetramethyl-1,3-diaminopropane and methanol to a solution of cuprous oxide in 35% aqueous hydrochloric acid. Separately, a monomer solution was prepared in the air by dissolving 2,6-dimethylphenol in a mixture of toluene and n-butanol. The above-prepared catalytic solution and monomer solution were separately fed into the first reaction vessel at constant feeding rates, respectively, such that the 2,6-dimethylphenol concentration of the solution was 20% by weight, that the reaction medium consisted of toluene, n-butanol and methanol in weight proportions of 60:20:20, and that 0.04 gram atom of copper, 0.368 gram atom of chlorine ion, 0.95 mole of N-ethylaniline and 2 moles of N,N,N',N'-tetramethyl-1,3-diaminopropane were present per 100 moles of 2,6-dimethylphenol. 2,6-Dimethylphenol was fed into the vessel at a rate of 224 g/hr.

Oxygen gas was continuously introduced into the first reaction vessel while circulating the mixture vigorously by means of the above-mentioned circulating pump and maintaining the temperature of the inside of the vessel at 30° C. The mixture transferred from the first reaction vessel to the second reaction vessel by means of the head pressure was homogeneous. Into the second reaction vessel, oxygen gas was introduced at a rate of 500 ml/min while stirring the mixture vigorously with the above-mentioned stirrer and maintaining the temperature of the inside of the vessel at 25° C. Separation of a polymer from the reaction medium was observed and the polymer was uniformly dispersed in the reaction medium by the shear force due to the agitation. The polymer dispersion was transferred from the second reaction vessel to the third reaction vessel by overflow. Into the third reaction vessel, oxygen gas was introduced at a rate of 200 ml/min while stirring the dispersion vigorously with the above-mentioned stirrer and maintaining the temperature of the inside of the vessel at 25° C., thereby forming a yellowish white slurry. The yellowish white slurry was continuously taken out from the third reaction vessel by overflow. Methanol was added to the slurry and the resulting mixture was filtered to collect the polymer. The polymer was subjected to sufficient purification using a mixed solvent of toluene, n-butanol and methanol and a dilute hydrochloric acid, and washed, followed by drying. The viscosity ($\eta_{sp}/c$) of the thus-obtained polymer was 0.60±0.03. The polymer having the same viscosity could be produced over a prolonged period of time. The color index of the polymer was 0.7, and that of the polymer after compression molding at 310° C. was 4.6.

EXAMPLE 42

Substantially the same procedure as described in Example 41 was repeated except that N-n-butylaniline was used in place of N-ethylaniline. The results are shown in Table 3.

EXAMPLES 43 TO 50

Substantially the same procedure as described in Example 1 was repeated except that the components of the catalyst were varied as shown in Table 1. The results are shown in Table 1.

EXAMPLE 51

Substantially the same procedure as described in Example 41 was repeated except that 0.95 mole of di-n-butylamine was used in place of N-ethylaniline, and that 48% hydrobromic acid was used in place of 35% hydrochloric acid.

The viscosity ($\eta_{sp}/c$) of the thus-obtained polymer was 0.60±0.03. The polymer having the same viscosity could be produced over a prolonged period of time. The color index of the polymer was 0.4, and that of the polymer after compression molding at 310° C. was 3.3. The results are shown in Table 4.

EXAMPLES 52 TO 68

Substantially the same procedure as described in Example 1 was repeated except that the components of the catalyst were varied as shown in Table 1. The results are shown in Table 1.

EXAMPLE 69

Substantially the same procedure as described in Example 41 was repeated except that the amount of N-ethylaniline was varied as shown in Table 3, that 0.5 mole of di-n-butylamine was added as an additional component of the catalyst, and that the feeding rate of 2,6-dimethylphenol was varied as shown in Table 3.

The viscosity ($\eta_{sp}/c$) of the thus-obtained polymer was 0.62±0.03. The polymer having the same viscosity could be produced over a prolonged period of time. The color index of the polymer was 0.4 and that of the polymer after compression molding at 310° C. was 3.1.

Next, a composition comprising 55 parts by weight of the above polymer, 45 parts by weight of a rubber-reinforced polystyrene [Styron 492 (Styron: registered trademark) manufactured and sold by Asahi Kasei Kogyo Kabushiki Kaisha, Japan], 4 parts by weight of triphenylphosphate and 0.5 parts by weight of octadecyl-3-(3,5-di-tert-butyl-4-hydroxyphenyl)propionate [Irganox 1076 (Irganox: registered trademark) manufactured and sold by Ciba-Geigy (Japan) Co., Ltd.] was prepared. Then, the resulting mixture was melt-kneaded at 290° C.

The Izod impact strength of the resulting composition was 12 Kg-cm/cm as measured in accordance with ASTM D-256. The results are shown in Table 3.

EXAMPLES 70 TO 85

Substantially the same procedure as described in Example 1 was repeated except that the components of each of the catalysts were varied as shown in Table 1. The results are shown in Table 1.

EXAMPLE 86

Substantially the same procedure as described in Example 41 was repeated except that mixed xylene was used in place of toluene, that 0.06 gram atom of copper, 0.55 gram atom of chlorine ion, 0.5 mole of N-phenylethanolamine, 0.5 mole of di-n-butylamine and 2 moles of N,N,N',N'-tetramethyl-1,3-diaminopropane were present per 100 moles of 2,6-dimethylphenol, and that the feeding rate of 2,6-dimethylphenol was 208 g/hr.

The viscosity ($\eta_{sp}/c$) of the thus-obtained polymer after drying was 0.62±0.03. The polymer having the same viscosity could be produced over a prolonged period of time. The color index of the polymer was 0.3 and that of the polymer after compression molding at 310° C. was 3.0.

Next, using the above polymer, a composition as defined in Example 69 was prepared in substantially the same manner as described in Example 69.

The Izod impact strength of the thus obtained composition was 12 Kg-cm/cm as measured in accordance with ASTM D-256.

EXAMPLE 87

Substantially the same procedure as described in Example 41 was repeated except that cupric chloride (CuCl$_2$.2H$_2$O) was used in place of cuprous oxide and 0.06 gram atom of copper, 0.55 gram atom of chlorine ion including that from cupric chloride and that from hydrochloric acid, 0.95 mole of di-n-butylamine and 3 moles of N,N,N',N'-tetramethyl-1,3-diaminopropane were present per 100 moles of 2,6-dimethylphenol, that the feeding rate of 2,6-dimethylphenol was 208 g/hr, and that the reaction medium consisted of xylene, n-butanol and methanol in weight proportions of 70:10:20. The viscosity ($\eta_{sp}$/c) of the thus obtained polymer was 0.59±0.03. The polymer having the same viscosity could be produced over a prolonged period of time.

The color index of the polymer was 0.5 and that of the polymer after compression molding at 310° C. was 3.4. The results are shown in Table 4.

EXAMPLE 88

Substantially the same procedure as described in Example 41 was repeated except that cupric bromide was used in place of cuprous oxide and 0.05 gram atom of copper, 0.46 gram atom of bromine ion including that from cupric bromide and that from hydrobromic acid, 0.95 mole of di-n-butylamine, 2 moles of N,N,N',N'-1,3-diaminopropane were present per 100 moles of 2,6-dimethylphenol, that the feeding rate of 2,6-dimethylphenol was 224 g/hr, and that the reaction medium consisted of xylene, n-butanol and methanol in weight proportions of 65:10:25. The viscosity ($\eta_{sp}$/c) of the thus obtained polymer was 0.61±0.03. The polymer having the same viscosity could be produced over a prolonged period of time. The color index of the polymer was 0.4 and that of the polymer after compression molding at 310° C. was 3.2. The results are shown in Table 4.

TABLE 1

| | Catalyst | | | | |
|---|---|---|---|---|---|
| No. | Copper compound (gram atom %*[1]) | 1,3-Diamine (mole %*[2]) | Halogen compound (mole %*[2]) | Additional component of catalyst (mole %*[2]) | Viscosity of polymer ($\eta_{sp}$/c*[3]) |
| Example | | | | | |
| 1 | Cu$_2$O (0.05) | N,N,N',N'—tetramethyl-1,3-diaminopropane (2) | HCl (0.46) | —(—) | 0.53 |
| 2 | Cu$_2$O (0.05) | N,N,N',N'—tetramethyl-1,3-diamino-1-methylpropane (2) | HCl (0.46) | —(—) | 0.46 |
| 3 | Cu$_2$O (0.1) | N,N,N',N'—tetramethyl-1,3-diamino-1-methylpropane (2) | HCl (0.92) | —(—) | 0.56 |
| 4 | Cu$_2$O (0.05) | N,N,N',N'—tetramethyl-1,3-diaminopropane (2) | HBr (0.46) | —(—) | 0.54 |
| 9 | Cu$_2$O (0.03) | N,N,N',N'—tetramethyl-1,3-diaminopropane (2) | HBr (0.276) | N—phenylethanolamine (0.95) | 0.56 |
| 10 | Cu$_2$O (0.04) | N,N,N',N'—tetramethyl-1,3-diaminopropane (2) | HBr (0.368) | N—phenylethanolamine (0.95) | 0.82 |
| 11 | Cu$_2$O (0.05) | N,N,N',N'—tetramethyl-1,3-diaminopropane (2) | HBr (0.46) | N—phenylethanolamine (0.95) | 0.98 |
| 12 | Cu$_2$O (0.05) | N,N,N',N'—tetramethyl-1,3-diaminopropane (2) | HCl (0.46) | N—(2',6'-dimethyl)-phenylethanolamine (0.95) | 0.75 |
| 13 | Cu$_2$O (0.06) | N,N,N',N'—tetramethyl-1,3-diamino-1-methylpropane (2) | HCl (0.552) | N-phenylethanolamine (0.95) | 0.67 |
| 14 | Cu$_2$O (0.06) | N,N,N',N'—tetramethyl-1,3-diamino-1-methylpropane (2) | HCl (0.552) | N—(2',6'-dimethyl)-phenylethanolamine (0.95) | 0.66 |
| 15 | Cu$_2$O (0.06) | N,N,N',N'—tetramethyl-1,3-diamino-1-methylpropane (2) | HCl (0.552) | N—(p-chloro)phenyl-ethanolamine (0.95) | 0.67 |
| 16 | Cu$_2$O (0.06) | N,N,N',N'—tetramethyl-1,3-diamino-1-methylpropane (2) | HCl (0.552) | N—(o-ethyl)phenyl-ethanolamine (0.95) | 0.67 |
| 17 | Cu$_2$O (0.07) | N,N,N',N'—tetramethyl-1,3-diamino-1-methylpropane (2) | HCl (0.644) | N—(o-ethyl)phenyl-ethanolamine (0.95) | 0.93 |
| 18 | Cu$_2$O (0.07) | N,N,N',N'—tetramethyl-1,3-diamino-1-methylpropane (2) | HCl (0.644) | N—(p-chloro)phenyl-ethanolamine (0.95) | 0.88 |
| 19 | CuSO$_4$ (0.04) | N,N,N',N'—tetramethyl-1,3-diaminopropane (2) | HBr (0.368) | N—phenylethanolamine (0.95) | 0.56 |
| 20 | Cu$_2$O (0.05) | N,N,N',N'—tetramethyl-1,3-diaminopropane (2) | HCl (0.46) | N—t-butylethanolamine (0.95) | 0.58 |
| 21 | Cu$_2$O (0.08) | N,N,N',N'—tetramethyl-1,3-diaminopropane (2) | HCl (0.74) | N—t-butylethanolamine (0.95) | 0.61 |
| 22 | Cu$_2$O (0.10) | N,N,N',N'—tetramethyl-1,3-diaminopropane (2) | HCl (0.92) | N—t-butylethanolamine (0.95) | 0.63 |
| 23 | Cu$_2$O (0.05) | N,N,N',N'—tetramethyl-1,3-diaminopropane (2) | HBr (0.46) | N—t-butylethanolamine (0.95) | 0.58 |
| 24 | CuSO$_4$ (0.05) | N,N,N',N'—tetramethyl-1,3-diaminopropane (2) | HBr (0.46) | N—t-butylethanolamine (0.95) | 0.56 |
| 25 | Cu$_2$O (0.05) | N,N,N',N'—tetramethyl-1,3-diamino-1-methylpropane (2) | HBr (0.46) | N—t-butylethanolamine (0.95) | 0.51 |
| 26 | Cu$_2$O (0.025) | N,N,N',N'—tetramethyl-1,3-diaminopropane (2) | HBr (0.23) | N—ethylaniline (0.95) | 0.59 |
| 27 | Cu$_2$O (0.03) | N,N,N',N'—tetramethyl-1,3-diaminopropane (2) | HBr (0.28) | N—ethylaniline (0.95) | 0.78 |
| 28 | Cu$_2$O (0.04) | N,N,N',N'—tetramethyl-1,3-diaminopropane (2) | HBr (0.37) | N—ethylaniline (0.95) | 0.89 |

TABLE 1-continued

| | Catalyst | | | | Viscosity of polymer ($\eta_{sp}/c$*[3]) |
|---|---|---|---|---|---|
| No. | Copper compound (gram atom %*[1]) | 1,3-Diamine (mole %*[2]) | Halogen compound (mole %*[2]) | Additional component of catalyst (mole %*[2]) | |
| 29 | Cu$_2$O (0.05) | N,N,N',N'—tetramethyl-1,3-diaminopropane (2) | HCl (0.46) | N—ethylaniline (0.95) | 0.74 |
| 30 | Cu$_2$O (0.05) | N,N,N',N'—tetramethyl-1,3-diaminopropane (2) | HCl (0.46) | N—ethylaniline (0.50) | 0.67 |
| 31 | Cu$_2$O (0.05) | N,N,N',N'—tetramethyl-1,3-diamino-1-methylpropane (2) | HCl (0.46) | N—ethylaniline (0.95) | 0.66 |
| 32 | Cu$_2$O (0.025) | N,N,N',N'—tetramethyl-1,3-diaminopropane (2) | HBr (0.23) | N—methylaniline (0.95) | 0.57 |
| 33 | Cu$_2$O (0.025) | N,N,N',N'—tetramethyl-1,3-diaminopropane (2) | HBr (0.23) | N—n-propylaniline (0.95) | 0.60 |
| 34 | Cu$_2$O (0.025) | N,N,N',N'—tetramethyl-1,3-diaminopropane (2) | HBr (0.23) | N—isopropylaniline (0.95) | 0.46 |
| 35 | Cu$_2$O (0.025) | N,N,N',N'—tetramethyl-1,3-diaminopropane (2) | HBr (0.23) | N—n-butylamine (0.95) | 0.60 |
| 36 | Cu$_2$O (0.05) | N,N,N',N'—tetramethyl-1,3-diaminopropane (2) | HBr (0.46) | N—ethyl-2,6-dimethyl-aniline (0.95) | 0.67 |
| 37 | Cu$_2$O (0.05) | N,N,N',N'—tetramethyl-1,3-diaminopropane (2) | HBr (0.46) | N—ethyl-2,4,6-trimethyl-aniline (0.95) | 0.69 |
| 38 | Cu$_2$O (0.05) | N,N,N',N'—tetramethyl-1,3-diaminopropane (2) | HBr (0.46) | diphenylamine (0.95) | 0.63 |
| 39 | Cu$_2$O (0.05) | N,N,N',N'—tetramethyl-1,3-diaminopropane (2) | HBr (0.46) | N—phenyl-1-naphthylamine (0.95) | 0.60 |
| 40 | Cu$_2$O (0.03) | N,N,N',N'—tetramethyl-1,3-diaminopropane (2) | HCl (0.276) | N—ethyl-2,4,6-trimethyl-aniline (0.95) | 0.53 |
| 43 | Cu$_2$O (0.05) | N,N,N',N'—tetramethyl-1,3-diaminopropane (2) | HBr (0.46) | di-n-butylamine (0.95) | 0.58 |
| 44 | Cu$_2$O (0.05) | N,N,N',N'—tetramethyl-1,3-diaminopropane (2) | HCl (0.46) | di-n-butylamine (0.95) | 0.57 |
| 45 | Cu$_2$O (0.05) | N,N,N',N'—tetramethyl-1,3-diaminopropane (2) | HCl (0.46) | diethylamine (0.95) | 0.58 |
| 46 | Cu$_2$O (0.05) | N,N,N',N'—tetramethyl-1,3-diaminopropane (2) | HCl (0.46) | di-n-propylamine (0.95) | 0.58 |
| 47 | Cu$_2$O (0.05) | N,N,N',N'—tetramethyl-1,3-diaminopropane (2) | HCl (0.46) | di-n-octylamine (0.95) | 0.59 |
| 48 | Cu$_2$O (0.05) | N,N,N',N'—tetramethyl-1,3-diaminopropane (2) | HCl (0.46) | dicyclohexylamine (0.95) | 0.60 |
| 49 | Cu$_2$O (0.05) | N,N,N',N'—tetramethyl-1,3-diaminopropane (2) | HCl (0.46) | dibenzylamine (0.95) | 0.60 |
| 50 | Cu$_2$O (0.07) | N,N,N',N'—tetramethyl-1,3-diamino-1-methylpropane (4) | HCl (0.64) | di-n-butylamine (0.5) | 0.59 |
| 52 | Cu$_2$O (0.05) | N,N,N',N'—tetramethyl-1,3-diaminopropane (2) | HCl (0.46) | di-n-butylamine (0.475) N—ethylaniline (0.475) | 0.67 |
| 53 | Cu$_2$O (0.05) | N,N,N',N'—tetramethyl-1,3-diaminopropane (2) | HCl (0.46) | di-n-butylamine (0.238) N—ethylaniline (0.712) | 0.72 |
| 54 | Cu$_2$O (0.05) | N,N,N',N'—tetramethyl-1,3-diaminopropane (2) | HCl (0.46) | di-n-butylamine (0.12) N—ethylaniline (0.83) | 0.73 |
| 55 | Cu$_2$O (0.05) | N,N,N',N'—tetramethyl-1,3-diaminopropane (2) | HCl (0.46) | di-n-butylamine (0.712) N—ethylaniline (0.238) | 0.62 |
| 56 | Cu$_2$O (0.05) | N,N,N',N'—tetramethyl-1,3-diaminopropane (2) | HCl (0.46) | di-n-butylamine (0.83) N—ethylaniline (0.12) | 0.58 |
| 57 | Cu$_2$O (0.05) | N,N,N',N'—tetramethyl-1,3-diaminopropane (2) | HCl (0.46) | di-n-butylamine (0.475) N—methylaniline (0.475) | 0.65 |
| 58 | Cu$_2$O (0.05) | N,N,N',N'—tetramethyl-1,3-diaminopropane (2) | HCl (0.46) | di-n-butylamine (0.475) N—n-propylaniline (0.475) | 0.68 |
| 59 | Cu$_2$O (0.05) | N,N,N',N'—tetramethyl-1,3-diaminopropane (2) | HCl (0.46) | di-n-butylamine (0.475) N—n-butylaniline (0.475) | 0.69 |
| 60 | Cu$_2$O (0.05) | N,N,N',N'—tetramethyl-1,3-diaminopropane (2) | HCl (0.46) | di-n-butylamine (0.475) N—ethyl-2,6-dimethyl-aniline (0.475) | 0.64 |
| 61 | Cu$_2$O (0.05) | N,N,N',N'—tetramethyl-1,3-diaminopropane (2) | HCl (0.46) | di-n-butylamine (0.475) N—ethyl-2,4,6-trimethyl-aniline (0.475) | 0.65 |
| 62 | Cu$_2$O (0.06) | N,N,N',N'—tetramethyl-1,3-diamino-1-methylpropane (2) | HCl (0.552) | di-n-butylamine (0.475) N—ethylaniline (0.475) | 0.63 |
| 63 | Cu$_2$O (0.05) | N,N,N',N'—tetramethyl-1,3-diaminopropane (2) | HCl (0.46) | di-ethylamine (0.475) N—ethylaniline (0.475) | 0.65 |
| 64 | Cu$_2$O (0.05) | N,N,N',N'—tetramethyl-1,3-diaminopropane (2) | HCl (0.46) | di-n-propylamine (0.475) N—ethylaniline (0.475) | 0.64 |
| 65 | Cu$_2$O (0.05) | N,N,N',N'—tetramethyl-1,3-diaminopropane (2) | HCl (0.46) | di-n-octylamine (0.475) N—ethylaniline (0.475) | 0.66 |
| 66 | Cu$_2$O (0.05) | N,N,N',N'—tetramethyl-1,3-diaminopropane (2) | HCl (0.46) | dicyclohexylamine (0.475) N—ethylaniline (0.475) | 0.67 |
| 67 | Cu$_2$O (0.05) | N,N,N',N'—tetramethyl-1,3-diaminopropane (2) | HCl (0.46) | dibenzylamine (0.475) N—ethylaniline (0.475) | 0.66 |
| 68 | Cu$_2$O (0.03) | N,N,N',N'—tetramethyl-1,3-diaminopropane (2) | HBr (0.276) | di-n-butylamine (0.475) N—ethylaniline (0.475) | 0.67 |
| 70 | Cu$_2$O (0.05) | N,N,N',N'—tetramethyl-1,3- | HCl (0.46) | di-n-butylamine (0.475) | 0.67 |

TABLE 1-continued

| No. | Catalyst Copper compound (gram atom %*1) | 1,3-Diamine (mole %*2) | Halogen compound (mole %*2) | Additional component of catalyst (mole %*2) | Viscosity of polymer ($\eta_{sp}/c$*3) |
|---|---|---|---|---|---|
| | | diaminopropane (2) | | N—phenylethanolamine (0.475) | |
| 71 | Cu$_2$O (0.05) | N,N,N',N'—tetramethyl-1,3-diaminopropane (2) | HCl (0.46) | di-n-butylamine (0.238) N—phenylethanolamine (0.712) | 0.73 |
| 72 | Cu$_2$O (0.05) | N,N,N',N'—tetramethyl-1,3-diaminopropane (2) | HCl (0.46) | di-n-butylamine (0.12) N—phenylethanolamine (0.83) | 0.75 |
| 73 | Cu$_2$O (0.05) | N,N,N',N'—tetramethyl-1,3-diaminopropane (2) | HCl (0.46) | di-n-butylamine (0.712) N—phenylethanolamine (0.238) | 0.63 |
| 74 | Cu$_2$O (0.05) | N,N,N',N'—tetramethyl-1,3-diaminopropane (2) | HCl (0.46) | di-n-butylamine (0.83) N—phenylethanolamine (0.12) | 0.61 |
| 75 | Cu$_2$O (0.05) | N,N,N',N'—tetramethyl-1,3-diaminopropane (2) | HCl (0.46) | di-n-butylamine (0.475) N—(o-ethyl)phenyl-ethanolamine (0.475) | 0.68 |
| 76 | Cu$_2$O (0.05) | N,N,N',N'—tetramethyl-1,3-diaminopropane (2) | HCl (0.46) | di-n-butylamine (0.475) N—(2',6'-dimethyl)phenylethanolamine (0.475) | 0.67 |
| 77 | Cu$_2$O (0.05) | N,N,N',N'—tetramethyl-1,3-diaminopropane (2) | HCl (0.46) | di-n-butylamine (0.475) N—(2',4',6'-trimethyl)phenylethanolamine (0.475) | 0.73 |
| 78 | Cu$_2$O (0.05) | N,N,N',N'—tetramethyl-1,3-diaminopropane (2) | HCl (0.46) | di-n-butylamine (0.475) N—(p-chloro)phenyl-ethanolamine (0.475) | 0.67 |
| 79 | Cu$_2$O (0.06) | N,N,N',N'—tetramethyl-1,3-diamino-1-methylpropane (2) | HCl (0.552) | di-n-butylamine (0.475) N—phenylethanolamine (0.475) | 0.63 |
| 80 | Cu$_2$O (0.05) | N,N,N',N'—tetramethyl-1,3-diaminopropane (2) | HCl (0.46) | diethylamine (0.475) N—phenylethanolamine (0.475) | 0.67 |
| 81 | Cu$_2$O (0.05) | N,N,N',N'—tetramethyl-1,3-diaminopropane (2) | HCl (0.46) | di-n-propylamine (0.475) N—phenylethanolamine | 0.66 |
| 82 | Cu$_2$O (0.05) | N,N,N',N'—tetramethyl-1,3-diaminopropane (2) | HCl (0.46) | di-n-octylamine (0.475) N—phenylethanolamine | 0.68 |
| 83 | Cu$_2$O (0.05) | N,N,N',N'—tetramethyl-1,3-diaminopropane (2) | HCl (0.46) | dicyclohexylamine (0.475) N—phenylethanolamine (0.475) | 0.69 |
| 84 | Cu$_2$O (0.05) | N,N,N',N'—tetramethyl-1,3-diaminopropane (2) | HCl (0.46) | dibenzylamine (0.475) N—phenylethanolamine | 0.68 |
| 85 | Cu$_2$O (0.04) | N,N,N',N'—tetramethyl-1,3-diaminopropane (2) | HBr (0.368) | di-n-butylamine (0.475) N—phenylethanolamine (0.475) | 0.70 |
| Comparative Example | | | | | |
| 1 | Cu$_2$O (0.5) | N,N,N',N'—tetramethyl-1,3-diaminopropane (4) | HI (1.15) | — (—) | only clouded.*4 |
| 2 | Cu$_2$O (0.1) | N,N,N',N'—tetramethyl-ethylenediamine (2) | HCl (0.92) | — (—) | no polymerization. |
| 3 | Cu$_2$O (0.05) | N,N'—di-t-butylethylenediamine (2) | HBr (0.46) | — (—) | no polymerization. |

*1 indicates the percentage of the amount in terms of gram atoms of copper of the copper compound contained in the catalyst relative to the amount in terms of moles of the phenol compound.
*2 indicates the percentage of the amount in terms of moles of the compound relative to the amount in terms of moles of the phenol compound.
*3 as defined hereinbefore.
*4 Formation of only a small quantity of polymer was observed.

TABLE 2

| No. | Catalyst Copper compound (gram atom %*1) | 1,3-Diamine (mole %*2) | Halogen compound (mole %*2) | Reaction medium Component (wt. %*5) | Component (wt. %*5) | Component (wt. %*5) | Viscosity of polymer ($\eta_{sp}/c$*3) |
|---|---|---|---|---|---|---|---|
| Example | | | | | | | |
| 5 | Cu$_2$O (0.05) | N,N,N',N'—tetramethyl-1,3-diaminopropane (2) | HCl (0.46) | toluene (60) | n-butanol (20) | ethanol (20) | 0.51 |
| 6 | Cu$_2$O (0.05) | N,N,N',N'—tetramethyl-1,3-diamino-1-methylpropane (2) | HCl (0.46) | toluene (60) | n-butanol (20) | ethanol (20) | 0.44 |
| 7 | Cu$_2$O (0.05) | N,N,N',N'—tetramethyl-1,3-diaminopropane (2) | HCl (0.46) | toluene (60) | n-butanol (20) | ethanol (10) methanol (10) | 0.52 |
| 8 | Cu$_2$O (0.05) | N,N,N',N'—tetramethyl-1,3-diaminopropane (2) | HCl (0.46) | toluene (75) | — (—) | ethanol (25) | 0.83 |
| Comparative | | | | | | | |

TABLE 2-continued

| No. | Catalyst Copper compound (gram atom %*1) | 1,3-Diamine (mole %*2) | Halogen compound (mole %*2) | Reaction medium Component (wt. %*5) | Component (wt. %*5) | Component (wt. %*5) | Viscosity of polymer ($\eta_{sp}/c$*3) |
|---|---|---|---|---|---|---|---|
| Example | | | | | | | |
| 4 | Cu$_2$O (0.05) | N,N,N',N'—tetramethyl-1,3-diaminopropane (2) | HCl (0.46) | toluene (75) | — (—) | n-propanol (25) | 0.22 |
| 5 | Cu$_2$O (0.05) | N,N,N',N'—tetramethyl-1,3-diaminopropane (2) | HCl (0.46) | toluene (75) | — (—) | iso-propanol (25) | 0.23 |
| 6 | Cu$_2$O (0.05) | N,N,N',N'—tetramethyl-1,3-diaminopropane (2) | HCl (0.46) | toluene (75) | — (—) | n-butanol (25) | no polymerization |

*1) as defined in Table 1
*2) as defined in Table 1
*3) as defined in Table 1
*5) indicates the percentage of the amount in terms of grams of the component relative to the amount in terms of grams of the reaction medium.

TABLE 3

| No. Example | Catalyst Copper compound (gram atom %*1) | 1,3-Diamine (mole %*2) | Halogen compound (mole %*2) | Additional component of catalyst (mole %*2) | Feeding rate of phenol compound (g/Hr) | Viscosity of polymer ($\eta_{sp}/c$*3) | Color index Polymer | Polymer after compression molding at 310° C. | Izod impact strength of composition |
|---|---|---|---|---|---|---|---|---|---|
| 41 | Cu$_2$O (0.04) | N,N,N',N'—tetramethyl-1,3-diaminopropane (2) | HCl (0.368) | N—ethyl-aniline (0.95) | 224 | 0.60 ± 0.03 | 0.7 | 4.6 | — |
| 42 | Cu$_2$O (0.04) | N,N,N',N'—tetramethyl-1,3-diaminopropane (2) | HCl (0.368) | N—buthyl-aniline (0.95) | 224 | 0.61 ± 0.03 | 0.6 | 4.2 | — |
| 69 | Cu$_2$O (0.04) | N,N,N',N'—tetramethyl-1,3-diaminopropane (2) | HCl (0.368) | Di-n-butyl-amine (0.5) N—ethyl-aniline (0.5) | 192 | 0.62 ± 0.03 | 0.4 | 3.1 | 12 |

*1) as defined hereinbefore.
*2) as defined hereinbefore.
*3) as defined hereinbefore.

TABLE 4

| No. Example | Catalyst Copper compound (gram/atom %*1) | 1,3-Diamine (mole %*2) | Halogen compound (mole %*2) | Additional component of catalyst (mole %*2) | Feeding rate of phenol compound (g/hr) | Reaction medium Component (wt %*5) | Component (wt %*5) | Component (wt %*5) | Viscosity of polymer ($\eta_{sp}/c$*3) | Color index polymer | polymer after compression molding at 310° C. |
|---|---|---|---|---|---|---|---|---|---|---|---|
| 51 | Cu$_2$O (0.04) | N,N,N',N'—tetra-methyl-1,3-diaminopropane (2) | HBr (0.368) | Di-n-butyl-amine (0.95) | 224 | toluene (60) | n-butanol (20) | methanol (20) | 0.60 ± 0.03 | 0.4 | 3.3 |
| 87 | CuCl$_2$.2H$_2$O (0.60) | N,N,N',N'—tetra-methyl-1,3-diaminopropane (3) | HCl (0.43) | Di-n-butyl-amine (0.95) | 208 | xylene (70) | n-butanol (10) | methanol (20) | 0.59 ± 0.03 | 0.5 | 3.4 |
| 88 | CuBr$_2$ (0.05) | N,N,N',N'—tetra-methyl-1,3-diaminopropane (2) | HBr (0.36) | Di-n-butyl-amine (0.95) | 224 | xylene (65) | n-butanol (10) | methanol (25) | 0.61 ± 0.03 | 0.4 | 3.2 |

*1) as defined hereinbefore.
*2) as defined hereinbefore.
*3) as defined hereinbefore.
*5) as defined hereinbefore.

What is claimed is:

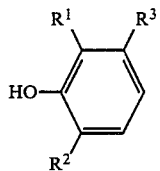

(I)

wherein $R^1$ represents a hydrocarbon residue having 1 to 4 carbon atoms or a substituted or unsubstituted phenyl group, $R^2$ represents a member selected from the group consisting of a halogen atom, a hydrocarbon residue having 1 to 4 carbon atoms and a substituted or unsubstituted phenyl group, and $R^3$ represents a member selected from the group consisting of a hydrogen atom, a halogen atom, a hydrocarbon residue having 1 to 4 carbon atoms and a substituted or unsubstituted phenyl group, with an oxidizing agent in a reaction medium containing at least one alcohol selected from the group consisting of methanol and ethanol in the presence of a catalyst comprising at least one copper compound, at least one 1,3-diamine compound selected from the group consisting of N,N,N',N'-tetramethyl-1,3-diaminopropane and an N,N,N',N'-tetramethyl-1,3-diaminopropane having a substituent on its propane chain, and at least one halogen compound selected from the group consisting of a bromine compound and a chlorine compound.

2. The method according to claim 1, wherein said oxidizing agent is oxygen gas or air.

3. The method according to claim 1, wherein said 1,3-diamine compound is at least one member selected from the group consisting of N,N,N',N'-tetramethyl-1,3-diaminopropane, N,N,N',N'-tetramethyl-1,3-diamino-1-methylpropane and N,N,N',N'-tetramethyl-1,3-diamino-2-methylpropane.

4. The method according to claim 1, wherein said catalyst further comprises at least one member selected from the group consisting of an N-(substituted or unsubstituted)phenylethanolamine, an N-alkylalkanolamine, an aniline having a substituent of a hydrocarbon residue at its N-position and a secondary aliphatic amine.

5. The method according to claim 4, wherein said member is a mixture of a secondary aliphatic amine and an N-(substituted or unsubstituted)-phenylethanolamine or an aniline having a substituent of a hydrocarbon residue at its N-position.

6. The method according to claim 1, wherein said alcohol is methanol.

7. The method according to claim 1, wherein said alcohol is contained in the reaction medium in an amount of from about 1 to 80% by weight, based on the weight of the medium.

8. The method according to claim 1, wherein said reaction medium is comprised of said alcohol and at least one solvent selected from the group consisting of an aromatic hydrocarbon and a halogenated hydrocarbon.

9. The method according to claim 8, wherein said solvent is employed in combination with at least one solvent selected from the group consisting of an alcohol, a ketone, an ester, an ether, an amide, and an aliphatic hydrocarbon.

10. The method according to claim 1, wherein said reaction of the phenol compound with the oxidizing agent is conducted in a continuous manner.

* * * * *

UNITED STATES PATENT AND TRADEMARK OFFICE
CERTIFICATE OF CORRECTION

PATENT NO.   : 4,788,277
DATED        : November 29, 1988
INVENTOR(S)  : Sadao IBE et al It is certified that error appears in the above-identified patent and that said Letters Patent is hereby corrected as shown below:

Column 1, lines 11-12, "and or" should read --and/or--.

Column 3, line 31, "2,3,6,trimethylphenol" should read --2,3,6-trimethylphenol--.

Column 4, line 3, "Example" should read --Examples--.

Column 5, lines 56-57, "N-(m-methyl)phenylethanolamine" should read --N-(p-methyl)phenylethanolamine--;

line 58, "N-(p-methoxy)phenylethanolamine" should read --N-(m-methoxy)phenylethanolamine--.

Column 23, line 1, before chemical formula insert:
   --1. A method for producing a polyphenylene ether, which comprises reacting a phenol compound represented by the formula:--.

Signed and Sealed this

Twenty-sixth Day of September, 1989

Attest:

DONALD J. QUIGG

Attesting Officer

Commissioner of Patents and Trademarks